(12) United States Patent
Kido et al.

(10) Patent No.: US 7,042,499 B1
(45) Date of Patent: May 9, 2006

(54) DIGITAL CAMERA INCLUDING POWER SUPPLY CONTROLLER RESPONSIVE TO CONNECTION DETECTION

(75) Inventors: Toshihito Kido, Matsubara (JP); Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/363,642

(22) Filed: Jul. 30, 1999

(30) Foreign Application Priority Data

Jul. 31, 1998 (JP) ................................. 10-216709

(51) Int. Cl.
- H04N 5/232 (2006.01)
- H04N 5/222 (2006.01)
- H04N 5/225 (2006.01)
- H04N 5/228 (2006.01)
- G03B 7/26 (2006.01)

(52) U.S. Cl. ............................. 348/211.14; 348/208.16; 348/333.07; 348/372; 396/303

(58) Field of Classification Search ................ 396/303, 396/381, 301; 348/207.1, 208.16, 211.4, 348/333.13, 333.07, 333.06, 372, 211.14
See application file for complete search history.

(56) References Cited

U.S. PATENT DOCUMENTS

| | | | | |
|---|---|---|---|---|
| 4,782,393 A | * | 11/1988 | Kawamura | 348/211.14 |
| 4,945,424 A | * | 7/1990 | Hiroki et al. | 386/118 |
| 5,040,068 A | * | 8/1991 | Parulski et al. | 348/376 |
| 5,717,496 A | | 2/1998 | Satoh et al. | 358/402 |
| 5,838,577 A | * | 11/1998 | Tokano | 358/906 |
| 5,844,606 A | * | 12/1998 | Suemoto et al. | 348/375 |
| 5,854,875 A | * | 12/1998 | Yamagishi | 386/120 |
| 5,895,127 A | * | 4/1999 | Yamamoto | 348/375 |
| 6,046,769 A | * | 4/2000 | Ikeda et al. | 348/211.99 |
| 6,075,949 A | * | 6/2000 | Hatakenaka et al. | 396/301 |
| 6,111,609 A | * | 8/2000 | Stevens | 348/372 |
| 6,130,717 A | * | 10/2000 | Arai et al. | 348/360 |
| 6,167,208 A | * | 12/2000 | Sato | 348/207.99 |
| 6,233,016 B1 | * | 5/2001 | Anderson et al. | 348/372 |
| 6,346,937 B1 | * | 2/2002 | Sasaki et al. | 345/211 |
| 2002/0054233 A1 | * | 5/2002 | Juen | 348/372 |
| 2003/0011699 A1 | * | 1/2003 | Tanizoe et al. | 348/333.07 |

FOREIGN PATENT DOCUMENTS

| | | | | |
|---|---|---|---|---|
| JP | 04107438 A | * | 4/1992 | |
| JP | 07322122 A | * | 12/1995 | |
| JP | 08317425 | | 11/1996 | |
| JP | 10079874 A | * | 3/1998 | |

* cited by examiner

*Primary Examiner*—Ngoc-yen Vu
*Assistant Examiner*—John M. Villecco
(74) *Attorney, Agent, or Firm*—Buchanan Ingersoll PC

(57) ABSTRACT

A digital camera comprises a camera body and an image sensing unit. The image sensing unit includes a taking lens, a driver of the taking lens and an image sensor, and is attachable to the camera body directly or by a cable. The camera body includes an image processor for processing image data from the image unit, a flash for emitting flash light, a recorder for recording the image data, a display for displaying images, and other circuits. An interface for a personal computer and a video capture adaptor can be attached to the camera body instead of the image sensing unit. The camera body is provided with a power source section having power supplying portions each assigned to a specific circuit such as the lens driver, the image sensor, the flash, the image processor, the interface and the adaptor. The camera body detects what is attached thereto and whether the cable is used, and supplies power only to those circuits that should be activated in accordance with the result of the detection.

23 Claims, 16 Drawing Sheets

FIG.11

| ADDRESS | EXPLANATION OF DATA |
|---|---|
| 00 | IMAGE SENSING UNIT OR INTERFACE TYPE |
| 01 | FILTER TYPE |
| 02 | DEFECTIVE PIXEL INFORMATION |
| 03 | NUMBER OF EFFECTIVE PIXELS (H) |
| 04 | NUMBER OF EFFECTIVE PIXELS (V) |
| 05 | EFFECTIVE PIXEL START POSITION (H) |
| 06 | EFFECTIVE PIXEL START POSITION (V) |
| 07 | NUMBER OF BLACK REFERENCE PIXELS (H) |
| 08 | NUMBER OF BLACK REFERENCE PIXELS (V) |
| 09 | BLACK REFERENCE PIXEL START POSITION (H) |
| 0A | BLACK REFERENCE PIXEL START POSITION (V) |
| 0B | HORIZONTAL SYNCHRONIZING SIGNAL PERIOD |
| 0C | VERTICAL SYNCHRONIZING SIGNAL PERIOD |
| 0D | WHITE BALANCE CORRECTION (R) |
| 0E | WHITE BALANCE CORRECTION (B) |
| 0F | IMAGE SENSING DEVICE SIZE |
| 10 | LENS F NUMBER (LONGEST FOCAL LENGTH CONDITION) |
| 11 | LENS FOCAL LENGTH (LONGEST FOCAL LENGTH CONDITION) |
| 12 | LENS FOCAL LENGTH IN TERMS OF 35 mm (LONGEST FOCAL LENGTH CONDITION) |
| 13 | LENS F NUMBER (SHORTEST FOCAL LENGTH CONDITION) |
| 14 | LENS FOCAL LENGTH (SHORTEST FOCAL LENGTH CONDITION) |
| 15 | LENS FOCAL LENGTH IN TERMS OF 35 mm (SHORTEST FOCAL LENGTH CONDITION) |

FIG.12

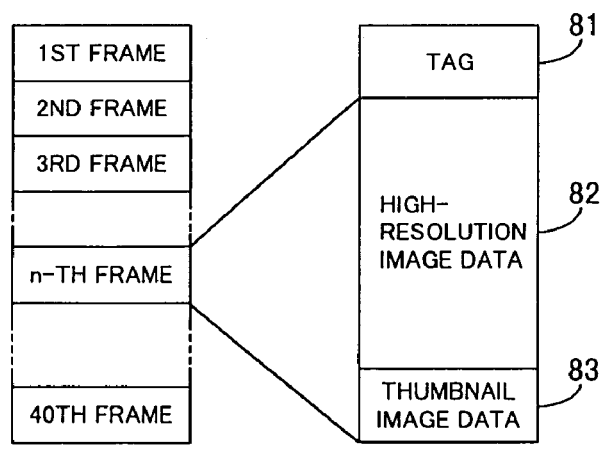

FIG. 21

| Condition of connection of accessory to camera body 2 | Voltage level of terminal 234g1 | Whether there is continuity between terminals 234g2 and 234g3 or not | Whether there is continuity between terminals 234g2 and 234g4 or not |
|---|---|---|---|
| Nothing is connected | High level | No | No |
| Image sensing unit 3 is directly connected | Low level | No | No |
| Image sensing unit 3 is connected through 1.5-m extension cable | Low level | Yes | No |
| Image sensing unit 3 is connected through 5-m extension cable | Low level | Yes | Yes |
| Only extension cable 32-1 or 32-2 is connected (image sensing unit 3 is not connected) | High level | Yes | Yes (extension cable 32-2) No (extension cable 32-1) |
| Personal computer interface is connected | Low level | No | Yes |
| Video capture adapter is connected | High level | No | Yes |

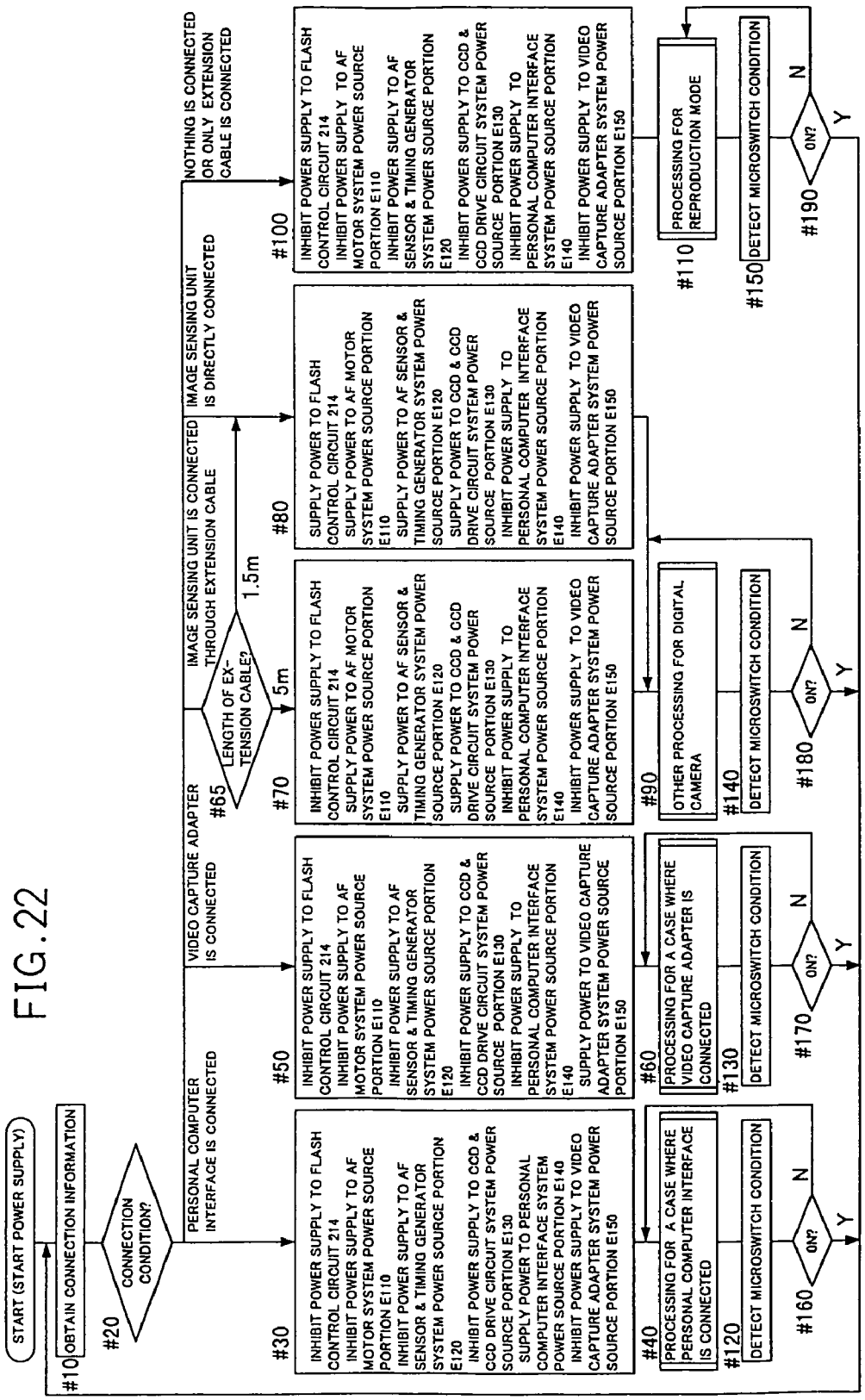

DIGITAL CAMERA INCLUDING POWER SUPPLY CONTROLLER RESPONSIVE TO CONNECTION DETECTION

This application is based on application No. H10-216709 filed in Japan on Jul. 31, 1998, the entire content of which is hereby incorporated by reference.

BACKGROUND OF THE INVENTION

1. Field of the Invention

The present invention relates to a digital camera for sensing the light from a subject so as to obtain a signal corresponding thereto, and particularly to control of power supply.

2. Description of the Prior Art

As a digital camera, in recent years, one has been known in which an image sensing unit is detachably attached to the camera body, interfaces for various apparatuses as accessories connect-able to the camera body are provided in addition to the image sensing unit, and not only shot images are recorded as image data but also its function can be extended by connecting an accessory to the camera body in accordance with the purpose. Digital cameras are becoming widespread, for example, as a peripheral apparatus of personal computers (PCs).

However, such conventional digital cameras are inconvenient to use and inferior in portability because in the digital cameras, the power source for driving circuits in an image sensing unit or an accessory is provided for each image sensing unit and each accessory and this increases the total number of necessary batteries. Moreover, although some digital cameras can be supplied with power from the commercial AC power source through an AC adapter when used indoors, even in such a case, the operability is inferior because it is necessary to unplug the AC adapter and plug another AC adapter every time the interface is changed.

To solve this problem, a digital camera has been proposed in which power is supplied to the circuits in the image sensing unit and an accessory connected to the camera body from the camera body by a power source provided in or connected to the camera body. In this case, since the power to be supplied varies among the circuits in the image sensing unit and accessories, a plurality of power source portions for supplying power suitable for each circuit from the power source are incorporated. Conventionally, since power is supplied to all the circuits, including the plurality of power source portions, in the camera body when the camera is activated, power consumption is great.

SUMMARY OF THE INVENTION

Accordingly, an object of the present invention is to provide a digital camera realizing reduction in power consumption.

To achieve the above-mentioned object, according to one aspect of the present invention, a digital camera is provided with an image sensing unit and a camera body. The image sensing unit includes: a taking lens; and an image sensing device for sensing a subject image formed by the taking lens and outputting the subject image as an electric signal. The camera body includes: an image processor for performing a predetermined processing on the electric signal from the image sensing unit; a detector for detecting a condition of connection of the image sensing unit to the camera body; and a power supply controller for controlling power supply in the camera body in accordance with a result of the detection.

According to another aspect of the present invention, a digital camera to which an interface for performing connection to an external device is connectable is provided with: an image processor for performing a predetermined processing on image data from an image sensing unit having a taking lens and an image sensing device; a detector for detecting a condition of connection of the interface to the digital camera; and a power supply controller for controlling power supply in the digital camera in accordance with a result of the detection.

According to still another aspect of the present invention, a digital camera to which an image sensing unit having a taking lens and an image sensing device is connectable is provided with: an image processor for performing a predetermined processing on image data from the image sensing unit; a detector for detecting a condition of connection of the image sensing unit to the digital camera; and a power supply controller for controlling power supply in the digital camera in accordance with a result of the detection.

According to still another aspect of the present invention, a power source control method in a digital camera to which an image sensing unit having a taking lens and an image sensing device is connectable is provided with the steps of: detecting a condition of connection of the image sensing unit to the digital camera; and controlling power supply in the digital camera in accordance with a result of the detection.

BRIEF DESCRIPTION OF THE DRAWINGS

This and other objects and features of this invention will become clear from the following description, taken in conjunction with the preferred embodiments with reference to the accompanying drawings in which:

FIG. 11 is a view showing information stored in an EEPROM;

FIG. 12 shows data arrangement in a memory card;

FIG. 21 shows a relationship between the condition of connection of connection devices to the camera body, and the voltage levels of terminals and continuity between terminals; and FIG. 22 is a flowchart showing control performed by a general controller.

DESCRIPTION OF THE PREFERRED EMBODIMENTS

Figure 1:
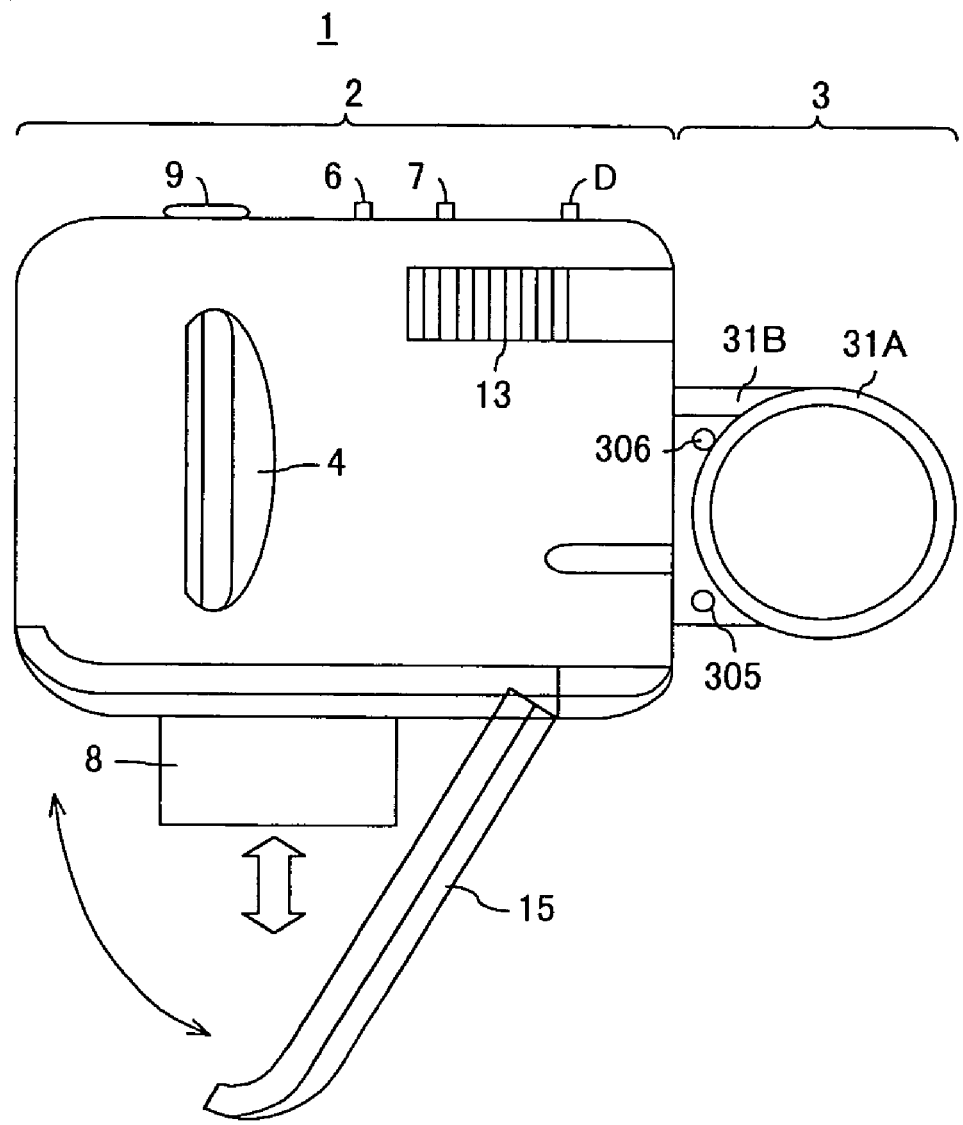
FIG. 1 is a front view of the appearance of a digital camera according to an embodiment of the present invention.

A digital camera according to the present invention will be described with reference to the drawings. A digital camera 1 according to an embodiment of the present invention has a box-shaped camera body 2 and a rectangular-parallelepiped-shaped image sensing unit 3 as illustrated in FIG. 1 showing a front view of the appearance thereof. First, the camera body 2 will be described. On the front surface of the camera body 2, a grip 4 is disposed in an appropriate position in a left end part, and a built-in flash 13 is disposed in an appropriate upper position in a right end part. On the top surface of the camera body 2, switches 6 and 7 for advancing frames when recorded images are reproduced are disposed substantially in the center.

The switch 6 is for advancing frames of recorded images in a direction that increases the frame number, that is, a direction of the order of shooting (hereinafter, the switch 6 will be referred to as "UP switch"). The switch 7 is for advancing frames of recorded images in a direction that decreases the frame number (hereinafter, the switch 7 will be referred to as "DOWN switch"). An erasing switch D for erasing image data recorded on a memory card 8 is disposed on the right side of the DOWN switch 7 when viewed from the front, and a shutter button 9 is disposed on the left side of the UP switch 6.

Figure 2:
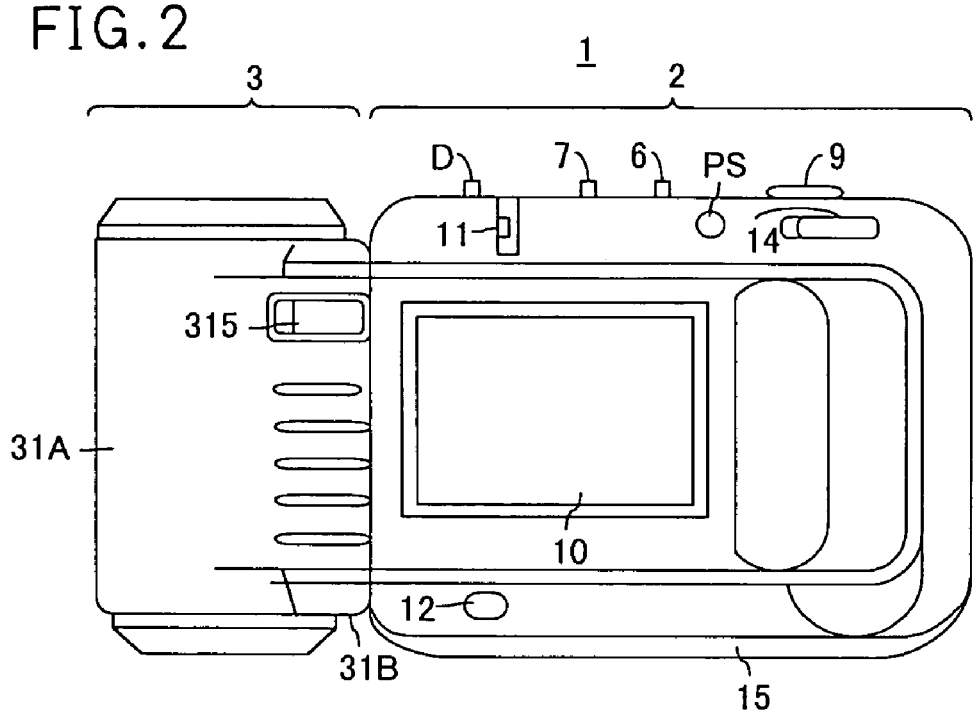
FIG. 2 is a back view of the appearance of the digital camera according to the embodiment of the present invention.

On the back surface of the camera body 2, as shown in FIG. 2, an LCD 10 for performing monitor display (corresponding to the viewfinder) of shot images and reproduction display of recorded images is disposed substantially in the center in the left end part. Below the LCD 10 are disposed a compression rate setting slide switch 12 for switching the compression rate K of image data to be recorded on the memory card 8 and a power switch PS for turning on and off the activation of the camera body 2.

The digital camera 1 has the following modes for flash light emission: "auto flash mode" in which the built-in flash 13 automatically fires in accordance with the subject brightness; "forced flash mode" in which the built-in flash 13 is forced to fire irrespective of the subject brightness; and "flash cancel mode" in which the built-in flash 13 is inhibited from firing. Every time the FL(flash) mode setting switch 11 is depressed, the "auto flash mode", the "forced flash mode" and the "flash cancel mode" are cyclically switched so that one of the modes is selected.

In the digital camera 1, the compression rate K can be selected between $\frac{1}{8}$ and $\frac{1}{20}$. For example, when the compression rate setting switch 12 is slid rightward, the compression rate K is set to $\frac{1}{8}$, and when the switch 12 is slid leftward, the compression rate K is set to $\frac{1}{20}$. While the compression rate K can be switched between two compression rates in this embodiment, the digital camera 1 may be designed so that the compression rate K can be selected from among three or more compression rates.

A shooting/reproduction mode setting switch 14 for switching between a "shooting mode" and a "reproduction mode" is disposed in an upper part at the right end of the back surface of the camera body 2. The shooting mode is for performing shooting. The reproduction mode is for performing reproduction display of shot images recorded on the memory card 8 on the LCD 10. The shooting/reproduction mode setting switch 14 is also a two-position slide switch. For example, when the switch 14 is slid rightward, the reproduction mode is set, and when the switch 14 is slid leftward, the shooting mode is set.

Figure 3:
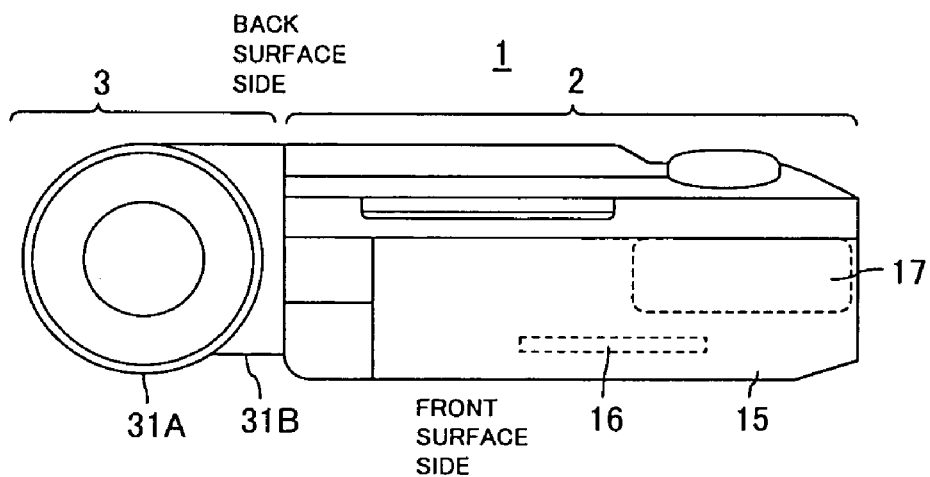
FIG. 3 is a bottom view of the appearance of the digital camera according to the embodiment of the present invention.

On the bottom surface of the camera body 2, as shown in FIG. 3, a card chamber 16 for the memory card 8 and a battery chamber 17 are provided. The openings of the chambers 16 and 17 are closed by a clamshell-type lid 15. The digital camera 1 of this embodiment is designed to use as the drive source four AA batteries connected in series or commercial AC power by connecting an AC adapter.

In summary, the camera body 2 mainly performs, after performing a predetermined signal processing on the image signals captured by the subsequently-described image sensing unit 3, processings such as display of the image signals on the LCD 10, recording of the image signals onto the memory card 8 and transfer of the image signals to a personal computer through an interface described later.

Subsequently, the image sensing unit 3 will be described. As shown in FIG. 1, the image sensing unit 3 is attached to the right side surface of the camera body 2 when viewed from the front so as to be detachable and rotatable within a plane parallel to the right side surface. The image sensing unit 3 has an image sensing unit main body 31A of a longitudinally elongated rectangular parallelepiped shape having a length substantially the same as the along-the-height length of the camera body 2 and having a depth length substantially the same as that of the camera body 2 as shown in FIG. 2. An attaching member 31B used for attaching the image sensing unit 3 to the camera body 2 is provided on one side surface of the image sensing unit main body 31A.

In the image sensing unit 3, since the image sensing unit main body 31A is a rectangular parallelepiped shape elongated in one direction and can be set along the side surface of the camera body 2 when the camera 1 is not used, a zoom lens elongated in the direction of the optical axis can be employed without the depth size of the digital camera 1 being increased. A mechanism of attaching the image sensing unit 3 to the camera body 2 by the attaching member 31B will be described later.

Figure 4:
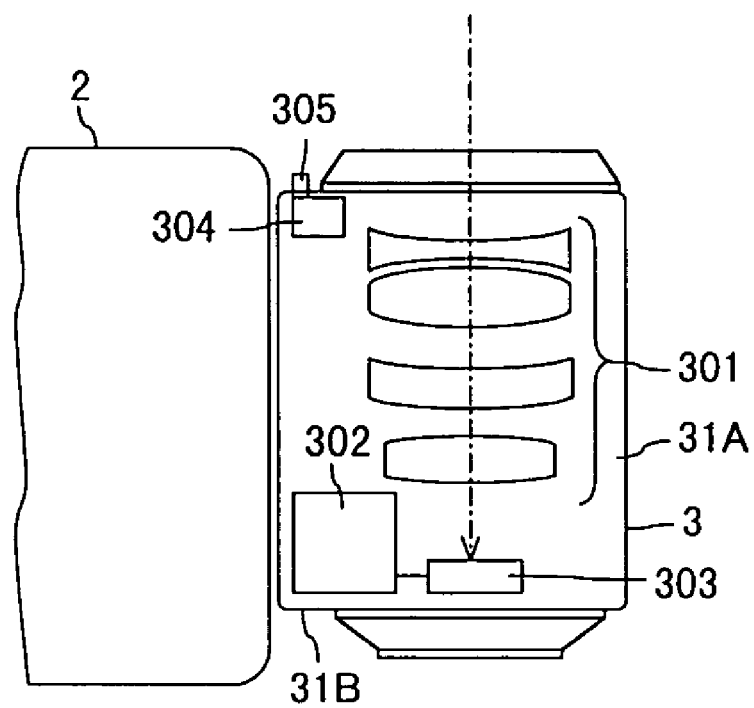
FIG. 4 is a view showing the appearance and the internal structure of an image sensing unit.

In the image sensing unit main body 31A, as shown in FIG. 4, a standard macro zoom lens 301 is disposed. An image sensing circuit 302 having a CCD color area sensor (hereinafter, referred to as "CCD") 303 is disposed in an appropriate position behind the standard macro zoom lens 301. Moreover, a light adjust circuit 304 having a sensor 305 for receiving reflected flash light from the subject is disposed in an appropriate position in the image sensing unit 3.

The sensor 305 and an AF (automatic focusing) sensor 306 for phase difference detection are disposed in appropriate positions respectively on the front end surface of the attaching member 31B. As shown in FIG. 2, an unlocking lever 315 is provided for enabling the detachment of the image sensing unit 3 from the camera body 2.

Figure 5:
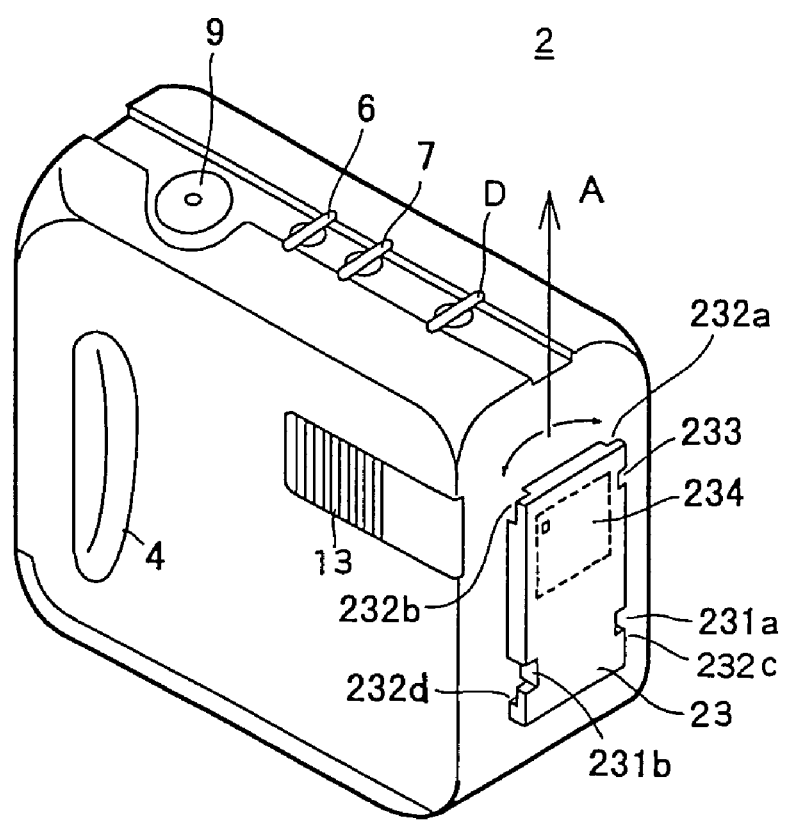
FIG. 5 is a perspective view of the appearance of the digital camera, in a condition where no connection device is connected to the camera body, according to the embodiment of the present invention.
Figure 6:
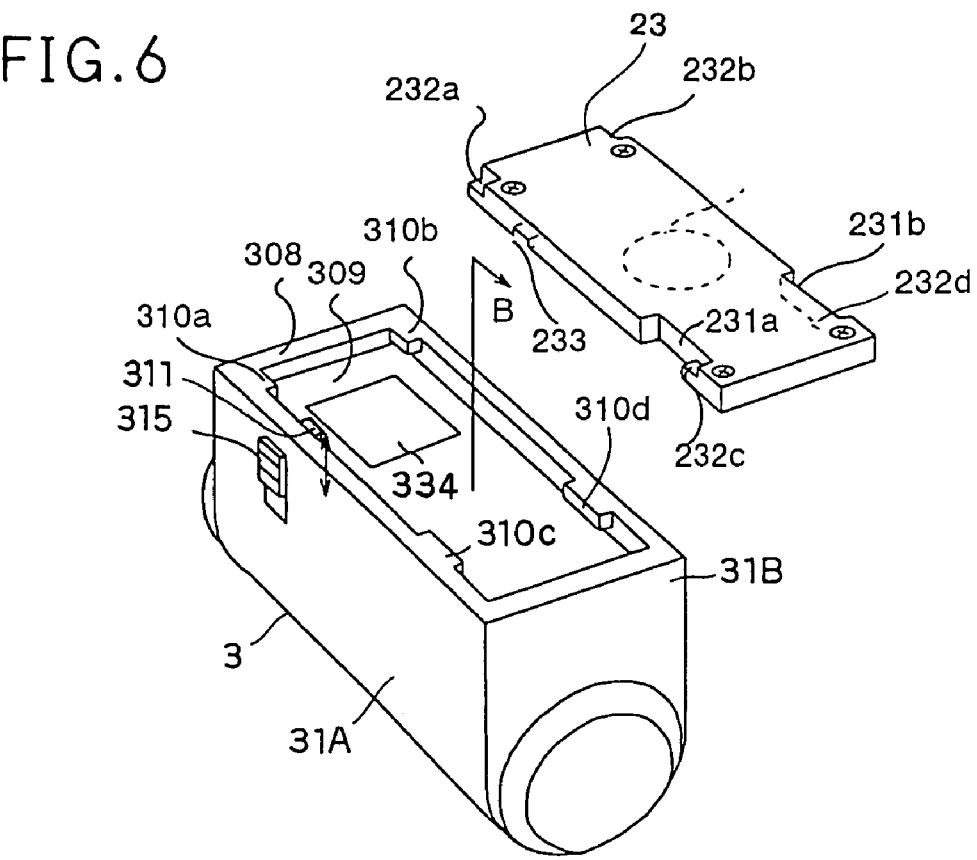
FIG. 6 is a view showing the structure of a connection portion between the camera body and the image sensing unit.

Subsequently, the mechanism of attaching the image sensing unit 3 to the camera body 2 will be described. On the right side surface of the camera body 2 when viewed from the front, as shown in FIG. 5, a connecting plate 23 to which the image sensing unit 3 is detachably attached is rotatably disposed within a plane parallel to the right side surface. By the rotation of the connecting plate 23, the image sensing unit 3 attached to the camera body 2 rotates with respect to a rotation reference position A in a range of substantially ±90 degrees. As shown in FIG. 6, an attaching surface 308 of the attaching member 31B has a rectangular hole 309 having four claws 310a to 310d in appropriate positions at the periphery. The image sensing unit 3 is attached to the camera body 2 by fitting the connecting plate 23 in the hole 309.

On the attaching surface of the connecting plate 23, a connecting terminal group 234 having a plurality of terminals is disposed, and in the hole 309 of the attaching member 31B, connecting terminal groups 334 are disposed so as to be opposed to the connecting terminal groups 234 on the attaching surface of the connecting plate 23. When the image sensing unit 3 is attached to the camera body 2 through the connecting plate 23, the image sensing unit 3 and the camera body 2 are electrically connected through the connecting terminal groups 234 and 334.

In the connecting plate 23, rectangular concave portions 231a and 231b are provided in appropriate positions at both long sides, and grooves are formed at both corners on one side and positions continuous with the concave portions 231a and 231b on a surface where the connecting terminal groups 234 are not disposed (hereinafter, this surface will be referred to as "rear surface") to provide engagement portions 232a, 232b, 232c and 232d with which the claws 310a to 310d of the attaching member 31B are engaged, respectively. On the surface where the connecting terminal groups 234 are disposed (hereinafter, this surface will be referred to as "obverse surface"), a groove is formed in an appropriate position on a long side where the concave 231a is formed to provide an engagement portion 233 in which a key 311 of the attaching member 31B is fitted.

Figure 7:
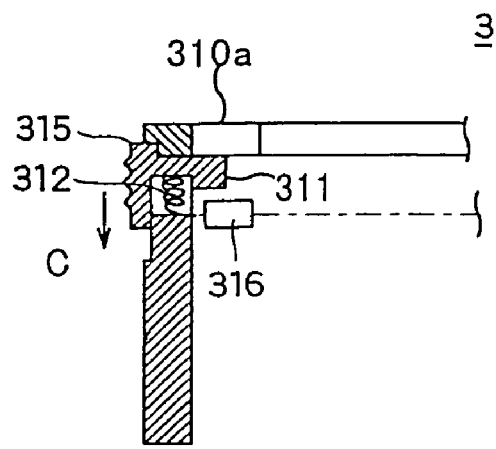
FIG. 7 is a view of assistance in explaining a mechanism of attachment and detachment between the camera body and the image sensing unit.

The attaching member 31B of the image sensing unit 3 is attached to the connecting plate 23 of the camera body 2 in the following manner: First, the attaching surface 308 of the attaching member 31B is placed in parallel with the connecting plate 23 so that the claws 310c and 310d of the hole 309 are opposed to the concave portions 231a and 231b of the connecting plate 23, respectively, and then, the attaching member 31B is pressed against the connecting plate 23. When this is done, the claws 310c and 310d are fitted in the concave portions 231a and 231b, and the key 311 is pushed by the surface of the connecting plate 23 to move to an unlocking position against the pressure of a spring 312 (FIG. 7) and the attaching member 31B is pushed until the rear surface of the connecting plate 23 is flush with the attaching surface 308 of the attaching member 31B.

Thereafter, when the attaching member 31B is moved to the rear end side (the arrow B direction in FIG. 6), the claws 310a to 310d of the attaching member 31B are engaged with the engagement portions 232a to 232d of the connecting plate 23 so that the attaching member 31B is undetachably attached to the connecting plate 23, and the key 311 is moved to a locking position by the pressure of the spring 312 to be fitted in the engagement portion 233, so that the attachment of the image sensing unit 3 to the connecting plate 23 is locked.

To detach the image sensing unit 3 from the connecting plate 23, the unlocking lever 315 is operated in a direction away from the attaching surface 308 (the arrow C direction in FIG. 7) to move the key 311 to the unlocking position so that the key member 311 is disengaged from the engagement portion 233, and after the attaching member 31B is moved relatively to the connecting plate 23 in the direction opposite to the B direction under this condition, the attaching member 31B is moved in a direction of separation from the connecting plate 23.

When the image sensing unit 3 is detached from or attached to the camera body 2, the unlocking lever 315 moves in the C direction and with this, a microswitch 316 is turned on, and this condition is detected by a subsequently-described general controller 211 in the camera body 2.

As the above-described image sensing unit 3 with a ½-inch CCD, in addition to a standard zoom lens unit with an actual focal length of 7 to 21 mm (approximately 38 to 115 mm in terms of 35-mm film) and F numbers of 3.6 (wide-angle side) to 5.6 (telephoto side), a wide-angle lens unit using a wide-angle lens element with an actual focal length of 5.2 mm (approximately 28 mm in terms of 35-mm film) and an F number of 1.9 can be attached.

Figure 8:
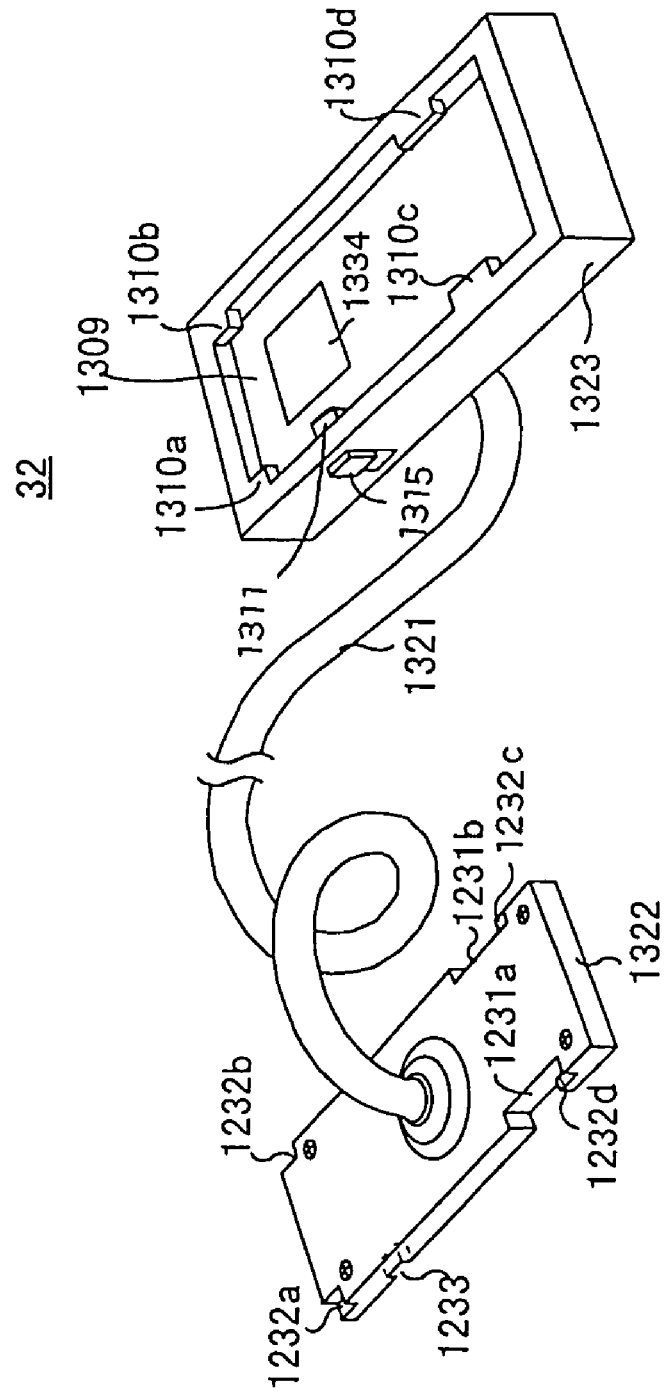
FIG. 8 shows the appearance of an extension cable.

While a structure in a case where the image sensing unit 3 is directly attached to the camera body 2 has been explained in the above description, the image sensing unit 3 can be connected to the camera body 2 through a specifically designed extension cable 32. FIG. 8 shows the appearance of the extension cable 32. In the extension cable, a connecting plate 1322 having the same structure as the connecting plate 23 is disposed at one end of a cable portion 1321 having a predetermined length, and a connecting portion 1323 having the same structure as the attaching member 31B of the image sensing unit 3 is disposed at the other end. When the image sensing unit 3 and the camera body 2 are connected through the extension cable 32, the connecting plate 1322 of the extension cable 32 is joined to the hole 309 of the attaching member 31B of the image sensing unit 3 and the connecting portion 1323 at the other end of the extension cable 32 is joined to the connecting plate 23 of the camera body 2.

The connecting plate 1322 of the extension cable 32 is provided with a connecting terminal group 1334 having a plurality of terminals so as to be opposed to the connecting terminal group 234 in the hole 309 of the attaching member 31B of the image sensing unit 3, and in a hole 1309 of the connecting portion 1323, the plurality of connecting terminal group 1334 opposed to the connecting terminal group 234 on the attaching surface of the connecting plate 23 of the camera body 2 are disposed. When the image sensing unit 3 is attached to the camera body 2 through the extension cable 32, the image sensing unit 3 and the camera body 2 are electrically connected through the connecting terminal groups.

The extension cable 32 includes two types; one is 1.5 meters in length and the other is 5 meters in length. The condition of connection between the camera body 2 and the image sensing unit 3, i.e., whether the image sensing unit 3 is connected through the extension cable 32 or not and the length of the extension cable 32 used, can be recognized based on a specific contact condition of a connecting terminal 234g described later.

Figure 9:
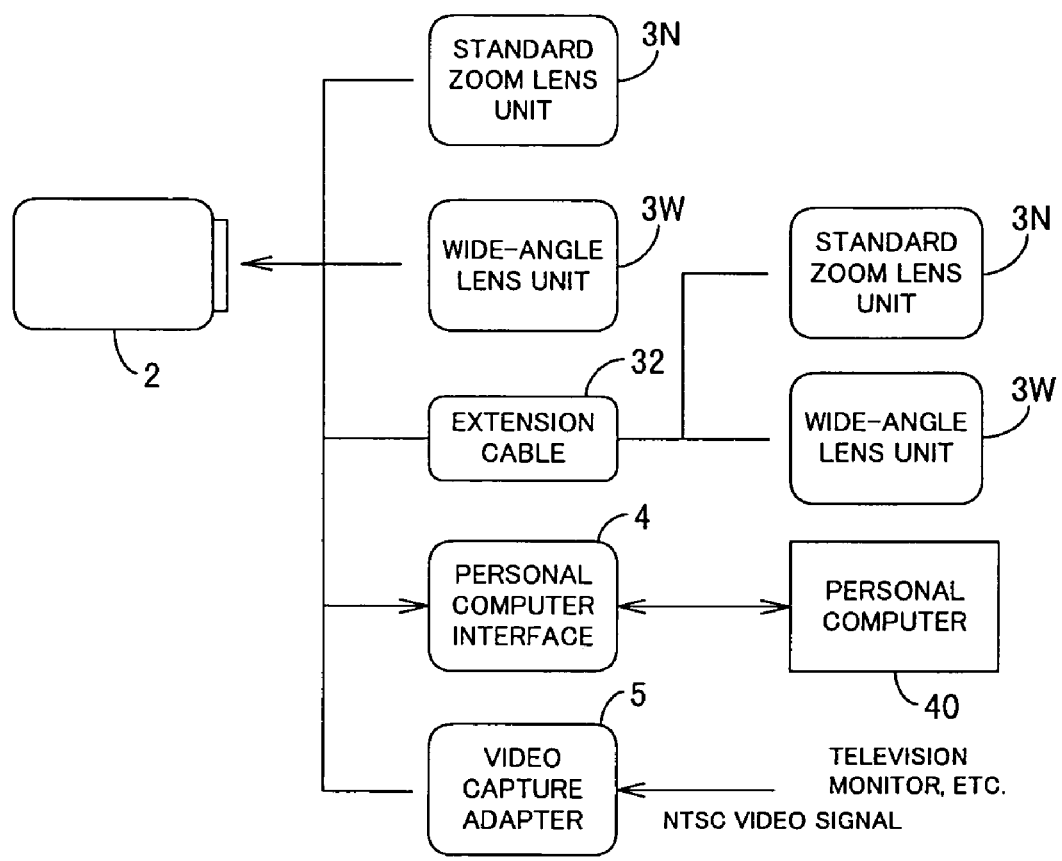
FIG. 9 is a view showing a system using the digital camera.

Subsequently, a system using the digital camera 1 will be described with reference to FIG. 9. For the camera body 2, not only the connection of an image sensing unit such as a standard zoom lens unit 3N or a wide-angle lens unit 3W and the connection of the image sensing unit through the extension cable 32 are possible, as described above, but also an accessory such as a personal computer interface 4 or a video capture adapter 5 can be connected directly to the camera body 2 instead of the image sensing unit. In this embodiment, the mechanisms of connection and detachment of the image sensing unit and the interfaces 4 and 5 to and from the camera body 2 are all the same and the connecting terminals are compatible. In addition, a modem and an adapter for an external display can also be connected.

Figure 10:
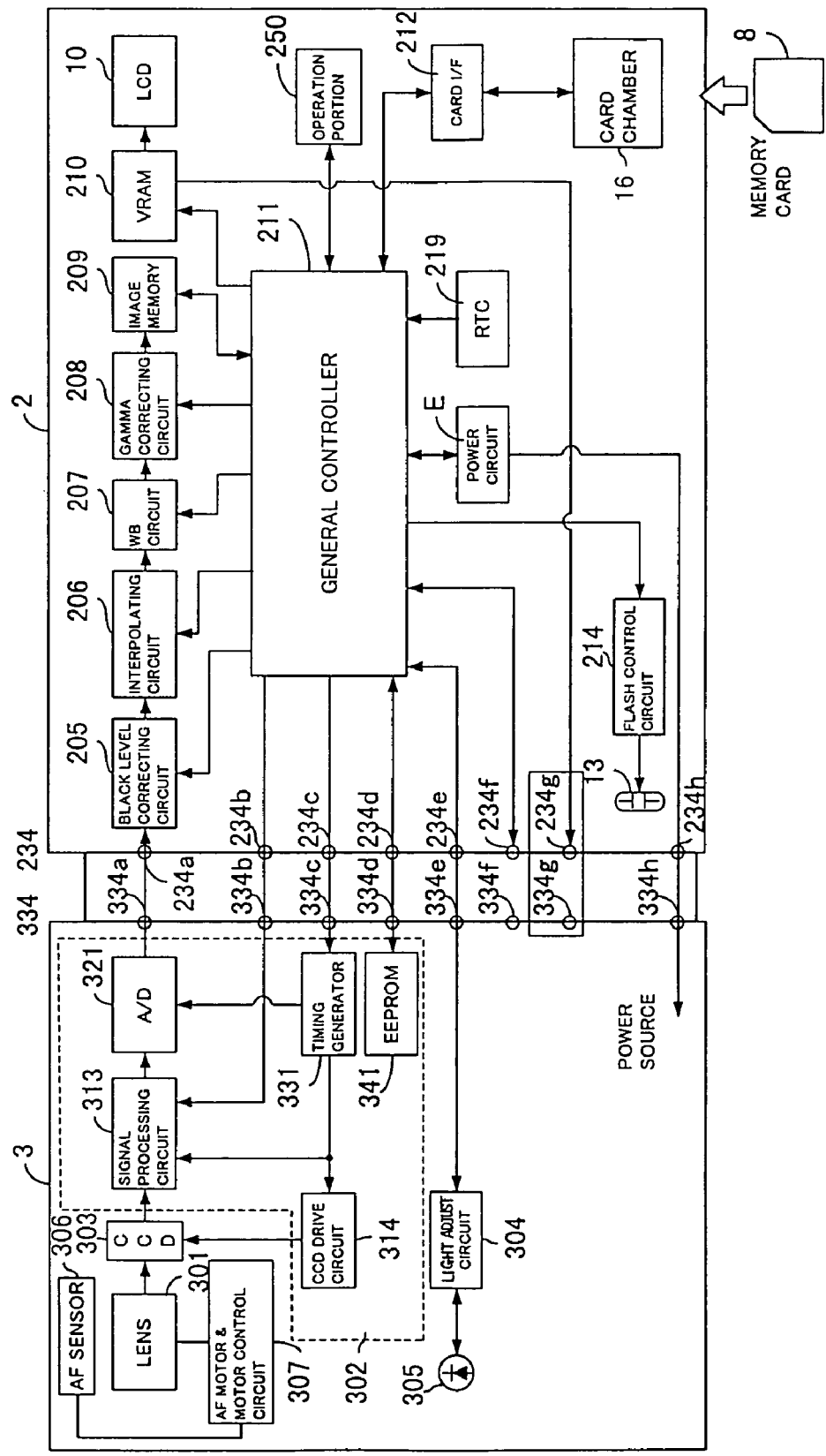
FIG. 10 is a block diagram showing the structure where the image sensing unit is connected to the camera body.

With reference to FIG. 10, a case in which the image sensing unit 3 is connected to the camera body 2 will be described. First, the internal block of the image sensing unit 3 will be described. The CCD 303 photoelectrically converts an optical image of the subject formed by the macro zoom lens 301 into electrical image signals (signals comprising a string of pixel signals received by each photo receiving element of the CCD) of red (R), green (G) and blue (B) components, and outputs the image signals. A timing generator 331 generates various timing pulses for controlling the driving of the CCD 303.

Since the diaphragm is fixed, exposure control in the image sensing unit 3 is performed by adjusting the exposure amount of the CCD 303, that is, the charge accumulation time of the CCD 303 corresponding to the shutter speed. When an appropriate shutter speed cannot be set at a low subject brightness, the levels of the image signals outputted from the CCD 303 are adjusted to thereby compensate for inappropriate exposure due to insufficient exposure. That is, when the brightness is low, exposure control is performed by combination the shutter speed and the gain adjustment. The image signal level adjustment is performed in gain adjustment of an AGC circuit in a signal processing circuit 313.

A CCD drive circuit 314 generates a drive signal for the CCD 303 based on a signal transmitted from the timing generator 331. The timing generator 331 generates clock signals such as a timing signal for an A/D converter 321 and signals for controlling reading of light reception signals of pixels (a horizontal transfer signal and a vertical transfer signal).

The signal processing circuit 313 performs a predetermined analog signal processing on the image signals as analog signals outputted from the CCD 303. The signal processing circuit 313 has a CDS (correlated double sampling) circuit and the AGC (automatic gain control) circuit, reduces noise of the image signals by the CDS circuit and adjusts the levels of the image signals by adjusting the gain of the AGC circuit.

The light adjust circuit 304 controls the light emission amount of the built-in flash 13 in flash shooting so as to be a predetermined light emission amount set by the general controller 211. In flash shooting, the reflected flash light from the subject is received by the sensor 305 simultaneously with the start of exposure, and when the light reception amount reaches the predetermined light emission amount, the light adjust circuit 304 outputs a light emission stop signal. In response to the light emission stop signal, the general controller 211 forcefully stops the light emission of the built-in flash 13 by a flash control circuit 214, so that the light emission amount of the built-in flash 13 is controlled so as to be the predetermined light emission amount.

The A/D converting circuit 321 converts the pixel signals as analog signals into 10-bit digital signals based on an A/D conversion clock inputted from the timing generator 331.

In the image sensor 3, the AF sensor 306 for phase difference detection is disposed. Based on an output of the AF sensor 306, the taking lens 301 is driven by an AF motor control circuit and an AF motor 307 and the subject image is brought to in-focus state on the CCD 303.

In an EEPROM 341, structural information of the image sensing unit 3 is stored as shown in FIG. 11. As described above, the image sensing unit 3 is replaceable with other units having different optical systems, CCDs and signal processing circuits. When the image sensing unit 3 is replaced, the general controller 211 obtains information of the image sensing unit from the EEPROM 341 and switches control based on the information.

The above-described image sensing unit 3 and the subsequently-described camera body 2 are electrically connected by eight connecting terminal groups 334a, 334b, 334c, 334d, 334e, 334f, 334g and 334h provided in the connecting terminal groups 334 of the image sensing unit 3 and eight connecting terminal groups 234a, 234b, 234c, 234d, 234e, 234f, 234g and 234h provided in the connecting terminal group 234 on the connecting plate 233 of the camera body 2. Note that the terminal 234f is a bus for the personal computer interface 4 or the video capture adapter 5, and is not used when the image sensing unit 3 or the extension cable 32 is connected to the camera body 2.

Subsequently, the internal block of the camera body 2 will be described. A case in which a standard zoom lens 3N unit is attached as the image sensing unit 3 will be described as an example. A timing control circuit (not shown) for generating the reference clock and clocks for the timing generator 331 and the A/D converter 321 is disposed in the camera body 2. The timing control circuit is controlled by the general controller 211.

A black level correcting circuit 205 corrects the black level of the A/D converted pixel signals (hereinafter, referred to as "pixel data") into a reference black level by use of a black reference signal. An interpolating circuit 206 generates, by interpolation, image data in which each pixel has 10-bit R, G and B components from raw image data outputted from the CCD 303.

A WB (white balance) circuit 207 converts the levels of pixel data of the R, G and B components so that the white balance is also adjusted after gamma correction. The WB circuit 207 uses a level conversion table inputted from the general controller 211 to convert the levels of pixel data of the R, G and B components. The conversion coefficient, i.e. characteristic inclination, of each color component of the level conversion table is set for each shot image by the general controller 211.

A gamma correcting circuit 208 corrects the gamma characteristic of the pixel data. The gamma correcting circuit 208 has six kinds of gamma correction tables with different gamma characteristics, and performs gamma correction of the pixel data based on a predetermined gamma correction table in accordance with the shooting scene and the shooting condition.

An image memory 209 is for storing therein the pixel data outputted from the gamma correcting circuit 208. The image memory 209 has a storage capacity corresponding to one frame. That is, when the CCD 303 has n×m pixels, the image memory 209 has a storage capacity for pixel data corresponding to n×m pixels, and the pixel data are each stored in a corresponding pixel position.

A VRAM 210 is a buffer memory for the image data reproduction-displayed on the LCD 10. The VRAM 210 has a storage capacity for the image data corresponding to the number of pixels of the LCD 10.

In the shooting standby state, after predetermined signal processings are performed by the circuits 205 to 208 on the pixel data of images shot by the image sensing unit 3 every ¹⁄₃₀ second, the pixel data are stored in the image memory 209 and are transferred to the VRAM 210 through the general controller 211 so as to be displayed on the LCD 10. That is, liveview display is performed. Consequently, the user can visually confirm the subject image by the image displayed on the LCD 10.

In the reproduction mode, after a predetermined signal processing is performed by the general controller 211 on the image read out from the memory card 8, the image is transferred to the VRAM 210 so as to be reproduction-displayed on the LCD 10. A card I/F 212 is an interface for writing image data onto the memory card 8 and reading image data from the memory card 8.

The flash control circuit 214 controls light emission of the built-in flash 13. The flash control circuit 214 includes a flash charging circuit, controls the execution or no execution, the amount and the timing of light emission of the built-in flash 13 based on a control signal from the general controller 211, and controls the light emission amount of the built-in flash 13 based on the light emission stop signal inputted from the light adjust circuit 304.

An RTC 219 is a clock circuit for managing the shooting date and time, and is driven by a non-illustrated different power source.

An operation portion 250 includes the above-described UP switch 6, DOWN switch 7, erasing switch D, shutter button 9, FL mode setting switch 11, compression rate setting switch 12, shooting/reproduction mode setting switch 14 and power switch PS.

A power circuit E comprises four batteries and a power source portion for converting supply voltage for supplying necessary power from the power source to each circuit, and supplies power to the circuits in the camera body 2 and to the circuits in the image sensing unit 3 or an accessory connected to the camera body 2 through the connecting terminals 234h and 334h. By connecting an AC adapter to the camera body 2, commercial AC power can be used as the power source instead of batteries.

The general controller 211 comprises a microcomputer, and performs centralized control of the shooting operation of the digital camera 1 by organically controlling the driving of the members in the image sensing unit 3 and the camera body 2.

The general controller 211 has a brightness determining portion for setting the exposure control value, i.e. shutter speed (SS), and a shutter speed setting portion. The brightness determining portion determines the brightness of the subject by use of the images captured by the CCD 303 every ¹⁄₃₀ second in the shooting standby state. That is, the brightness determining portion determines the brightness of the subject by use of the image data renewedly stored in the image memory 209. The brightness determining portion divides the storage area of the image memory 209 into nine blocks, and calculates the brightness data representing each block by use of the pixel data of the G (green) component included in each block.

The shutter speed setting portion sets the shutter speed, i.e. the integration period of time of the CCD 303, based on the result of the subject brightness determination by the brightness determining portion. The shutter speed setting portion has a table of the shutter speed SS.

The shutter speed SS is reset to ¹⁄₁₂₈ second when the camera is activated. In the shooting standby state, the shutter speed setting portion changes the shutter speed from the initial value to the high speed side or to the low speed side in steps in accordance with the result of the subject brightness determination by the brightness determining portion.

The general controller 211 has a filter portion for performing filtering processing and a recorded image forming portion for forming thumbnail images and compressed images to perform the above-described shot image recording processing, and has a reproduced image forming portion for forming reproduced images to reproduce images recorded on the memory card 8 on the LCD 10.

The filter portion corrects, by a digital filter, a high-frequency component of an image to be recorded to thereby correct the image quality associated with the contour. The filter portion has the following five kinds of digital filters for each of the compression rates K of ⅛ and ¹⁄₂₀: a digital filter for performing a normal contour correction; and two kinds of digital filters for enhancing the contour and two kinds of digital filters for weakening the contour with respect to the normal contour correction.

The recorded image forming portion reads out pixel data from the image memory 209 and forms thumbnail images and compressed images to be recorded onto the memory card 8. The recorded image forming portion reads out pixel data from the image memory 209 every eight pixels both in the horizontal and the vertical directions while performing scanning in a raster scanning direction, and successively transfers the pixel data to the memory card 8, thereby recording the thumbnail images onto the memory card 8 while forming them.

Moreover, the recorded image forming portion reads out all the pixel data from the image memory 209 and performs predetermined JPEG compression processings such as two-dimensional discrete cosine transformation and Haffman coding on the pixel data to generate image data of the compressed image, and records the compressed image data into a regular image area of the memory card 8.

When an instruction to perform shooting is given by the shutter button 9 in the shooting mode, the general controller 211 forms a thumbnail image and a compressed image, JPEG-compressed at the compression rate K set by the compression rate setting switch 12, of the image captured into the image memory 209 after the instruction is given, and records these images onto the memory card 8 together with tag information on the shot image (information such as frame number, exposure value, shutter speed, compression rate K, shooting date, ON or OFF of the flash at the time of shooting, scene information, and the result of image determination).

With respect to the images recorded by the digital camera 1, 40 frames of images can be stored when the compression rate is ¹⁄₂₀. As shown in FIG. 12, a tag portion 81, JPEG-compressed high-resolution image data (640×480 pixels) 82 and image data (80×60 pixels) 83 for thumbnail display are recorded in each frame. Each frame can be treated as an EXIF-format image file.

When the shooting/reproduction mode setting switch 14 is set to the reproduction mode, the image data with the highest frame number in the memory card 8 is read out, decompressed by the reproduced image forming portion and transferred to the VRAM 210, whereby the image with the highest frame number, that is, the most recently shot image is displayed on the display 10. By operating the UP switch 6, an image with a higher frame number is displayed. By depressing the DOWN switch 7, an image with a lower frame number is displayed.

Figure 13:
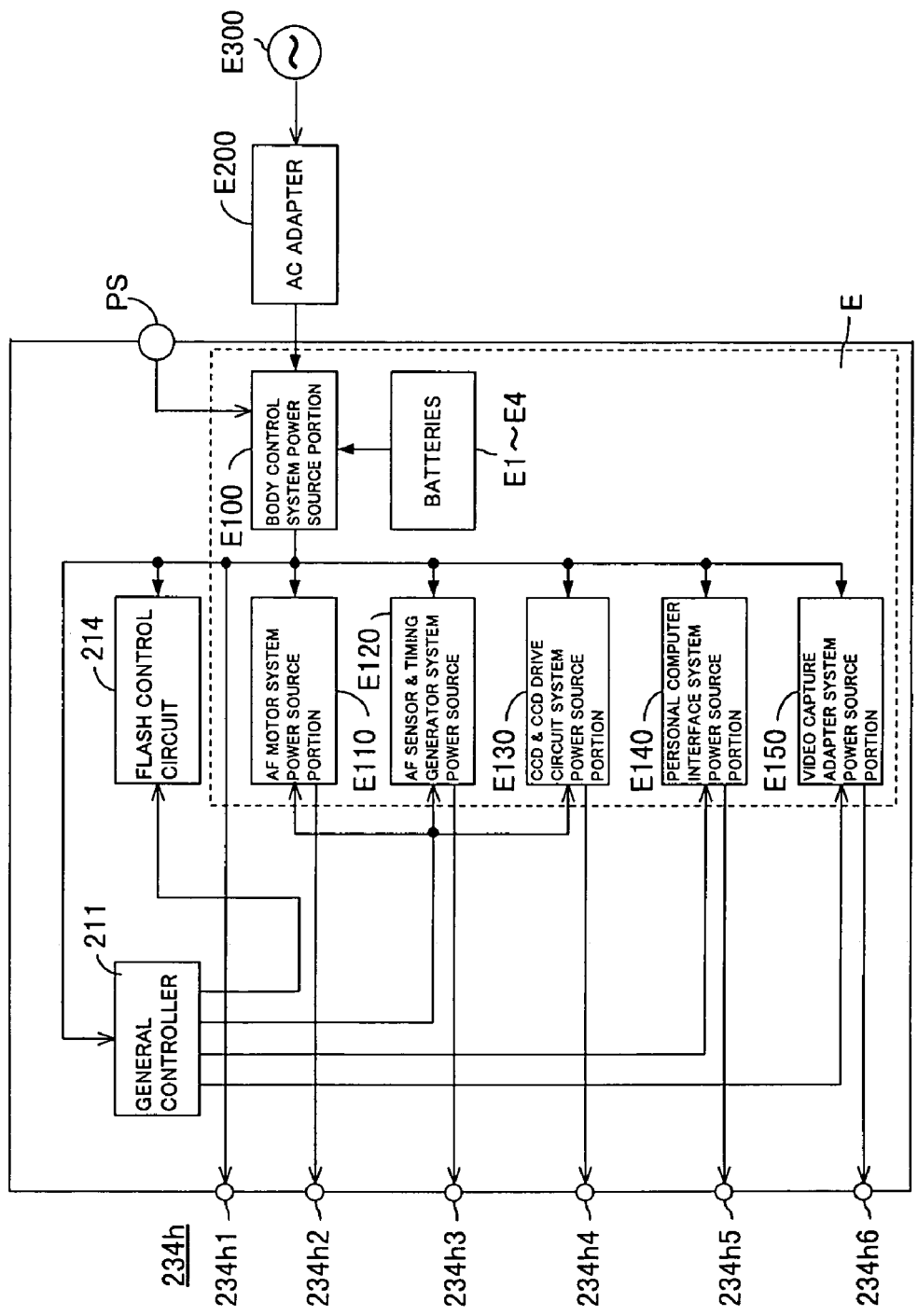
FIG. 13 is a block diagram showing the structure of power source portions.

Subsequently, the structure of the power circuit E in the camera body 2 will be described with reference to FIG. 13. Driving power is supplied from the four batteries E1 to E4 to all the circuit blocks (including the general controller 211) in the camera body 2 by a body control system power source portion E100. The body control system power source portion E100 drives also the signal processing circuit 313, the A/D converter 321 and the EEPROM 341 in the image sensing unit 3. The activation and deactivation of the body control system power source portion E100 is switched by operating the power switch PS.

To an AF motor system power source portion E110, an AF sensor and timing generator system power source portion E120, a CCD and CCD drive circuit system power source portion E130, a personal computer interface system power source portion E140 and a video capture adapter system power source portion E150, power is supplied from the main control system power source portion E100. Power supply to the power source portions other than the body control system power source portion E100 is controlled by the general controller 211 as described later. In each power source portion, by converting the voltage of the body control system power source portion E100, a voltage the most suitable for each circuit block in the image sensing unit 3 and accessories is generated. By using an AC adapter E200, a commercial AC power source E300 can be used as a power source, as well as the batteries E1 to E4.

The body control system power source portion E100 is for supplying power to all the circuit blocks in the camera body 2 and to the signal processing circuit 313, the A/D converter 321 and the EEPROM 341 in the image sensing unit 3, as noted above. The AF motor system power source portion E110, the AF sensor and timing generator system power source portion E120 and the CCD and CCD drive circuit system power source portion E130 are for supplying power to the AF motor and the motor control circuit 307, the AF sensor 306 and the timing generator 331 and the CCD 303 and the CCD drive circuit 314 in the image sensing unit 3, respectively. The personal computer interface system power source portion E140 is for supplying power to circuit blocks in the personal computer interface 4. The video capture adapter system power source portion E150 is for supplying power to circuit blocks in the video capture adapter 5. The power source portions supply power to the image sensing unit 3 or an accessory connected to the camera body 2 through terminals 234h1, 234h2, 234h3, 234h4, 234h5 and 234h6 of the connecting terminal group 234h.

Figure 14:
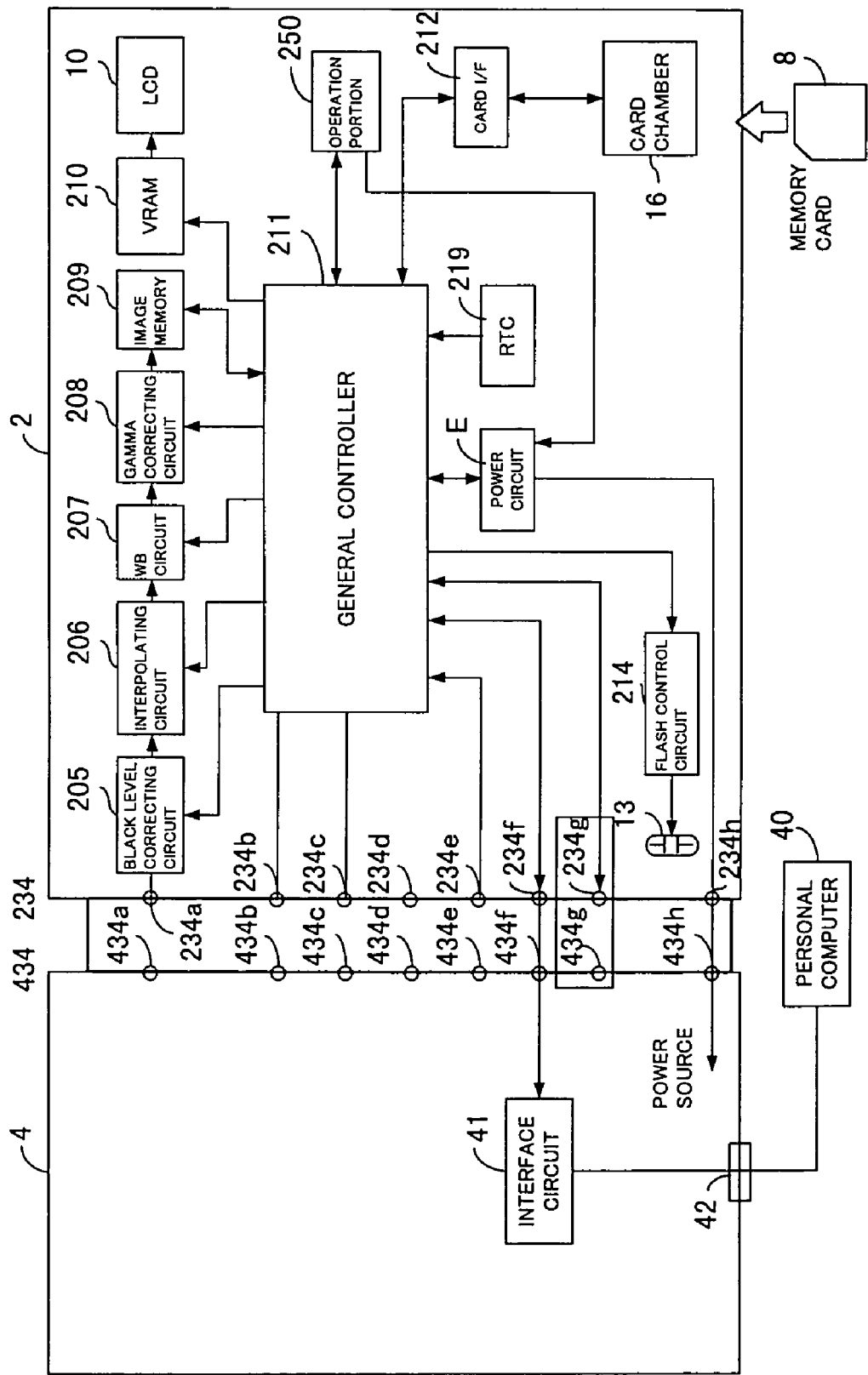
FIG. 14 is a block diagram showing the structure where a personal computer interface is connected to the camera body.

FIG. 14 is a block diagram in a case where the personal computer interface 4 is connected to the camera body 2 instead of the image sensing unit 3. In this case, the black level correcting circuit 205, the interpolating circuit 206, the WB circuit 207, the gamma correcting circuit 208, the built-in flash 13 and the flash control circuit 214 in the camera body 2 are deactivated, the shooting/reproduction mode setting switch 14 is disabled, and the digital camera 1 is always in the reproduction mode. The image memory 209 is used as a work area for processing.

When the personal computer interface 4 is connected, in response to an instruction from a personal computer 40, the shot image data read out from the memory card 8 are captured by the personal computer 40 through the card I/F 212, a reproduced image generating portion in the general controller 211, the connecting terminals 234f and 434f, an interface circuit 41 and a personal computer connecting terminal 42 under the control by the general controller 211. For the interface circuit 41, a known RS-232C or USB interface is usable. Power for driving the personal computer interface 4 is supplied from the personal computer interface system power source portion E140 in the power source portion of the camera body 2.

Figure 15:
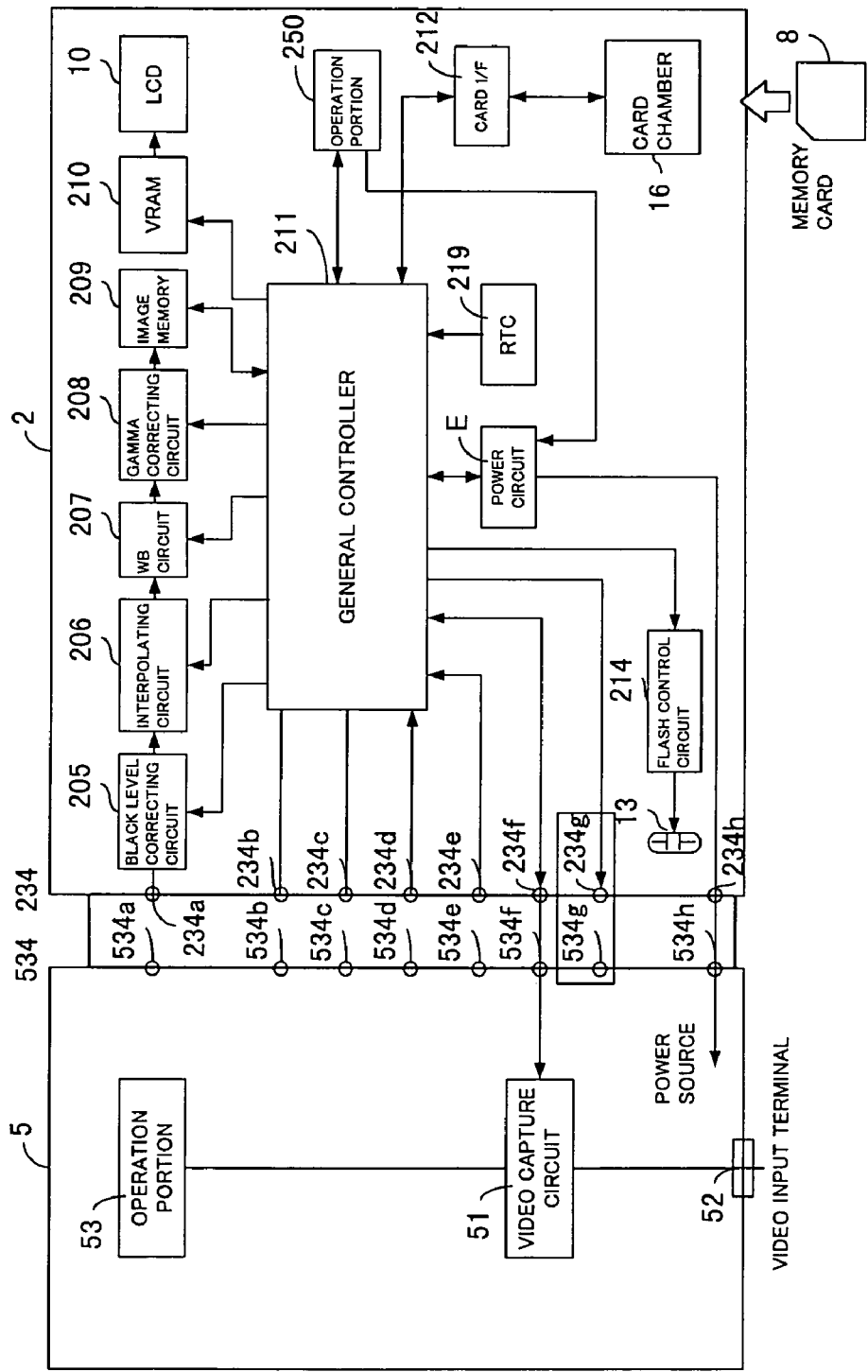
FIG. 15 is a block diagram showing the structure where a video capture adapter is connected to the camera body.

FIG. 15 is a block diagram in a case where the video capture adapter 5 is connected to the camera body 2 instead of the image sensing unit 3. In this case, the black level correcting circuit 205, the interpolating circuit 206, the WB circuit 207, the gamma correcting circuit 208, the built-in flash 13 and the flash control circuit 214 in the camera body 2 are deactivated, the shooting/reproduction mode setting switch 14 is disabled, and the digital camera 1 is always in the reproduction mode. The image memory 209 is used as a work area for processing. Power for driving the video capture adapter 5 is supplied from the video capture adapter system power source portion E150 in the power source portion of the camera body 2.

When the video capture adapter 5 is connected, after a video signal (e.g. an NTSC video signal outputted from a television tuner) inputted through a video input terminal 52 is digitized by a video capture circuit 51 in response to an operation instruction by an operation portion 53 of the video capture adapter 5, the video signal is processed by the general controller 211 at intervals of 1/30 second through the terminals 534f and 234f, so that the image data is developed on the VRAM 210. Consequently, the inputted video signal is displayed on the LCD 10. The operation portion 53 includes a capture button comprising a push button, and the image data at the instant of pushing the button is recorded onto the memory card 8.

By connecting the video capture adapter 5 to the digital camera 1, television signals and images shot by a different camera such as a video camera can easily be digitized and recorded, so that the convenience of the digital camera is increased. Moreover, since both images shot by a digital camera 1 and images shot by a video camera can be stored in one memory card 8, the image data in the memory card 8 can effectively be edited.

Subsequently, a method of identifying the connection device connected to the camera body 2 will be described with reference to FIGS. 16 to 20. Four terminals 234g1, 234g2, 234g3 and 234g4 of the connecting terminal group 234g of the camera body 2 serve as detection terminals. The general controller 211 detects the voltage level of the terminal 234g1, whether there is continuity between the terminals 234g2 and 234g3 or not and whether there is continuity between the terminals 234g2 and 234g4 or not to thereby detect seven conditions.

In the camera body 2, of the wiring between the connecting terminal group 234g and the general controller 211, the wiring with the connecting terminal 234g1, the wiring with the connecting terminal 234g3 and the wiring with the connecting terminal 234g4 are pulled up and the wiring with terminal 234g2 is not pulled up.

Figure 16:
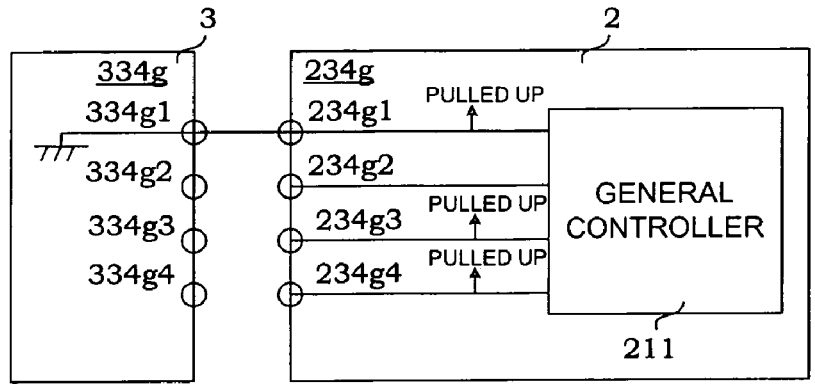
FIG. 16 shows condition in a case where the image sensing unit is connected to the camera body.

The image sensing unit 3 has four terminals 334g1, 334g2, 334g3 and 334g4 connecting with the four terminals 234g1, 234g2, 234g3 and 234g4 of the connecting terminal group 234g of the camera body 2, respectively. In the image sensing unit 3, the terminal 334g1 is grounded, and the other three terminals 334g2, 334g3 and 334g4 are not connected anywhere. The connection condition of the terminals in a case where the image sensing unit 3 is connected to the camera body 2 is shown in FIG. 16.

Figure 17:
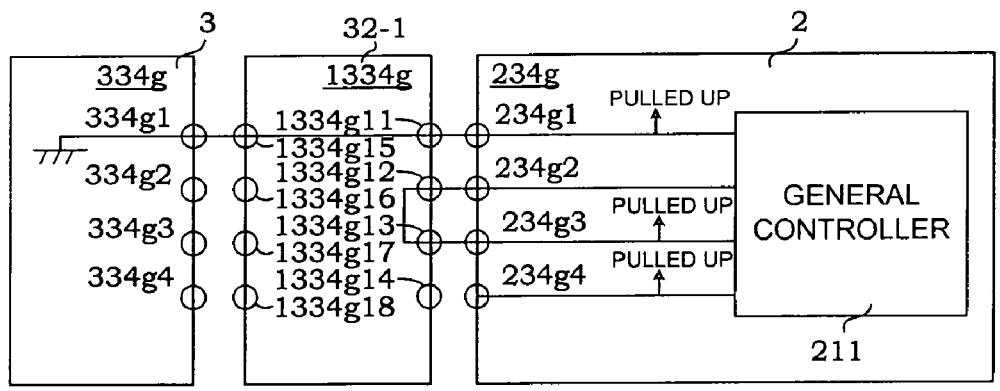
FIG. 17 shows condition where the image sensing unit is connected to the camera body through a 1.5-m extension cable.

The 1.5 meters extension cable 32-1 has four terminals 1334g11, 1334g12, 1334g13 and 1334g14 connecting with the four terminals 234g1, 234g2, 234g3 and 234g4 of the connecting terminal group 234g of the camera body 2, respectively, and four terminals 1334g15, 1334g16, 1334g17 and 1334g18 connecting with the four terminals 334g1, 334g2, 334g3 and 334g4 of the image sensing unit 3, respectively. In the 1.5 meters extension cable 32-1, the terminal 1334g and the terminal 1334g15 are connected together, the terminal 1334g12 and the terminal 1334g13 are connected together, and the other terminals 1334g14, 1334g16, 1334g17 and 1334g18 are not connected anywhere. The connection condition of the terminals in a case where the image sensing unit 3 is connected to the camera body 2 through the 1.5 meters extension cable 32-1 is shown in FIG. 17.

Figure 18:
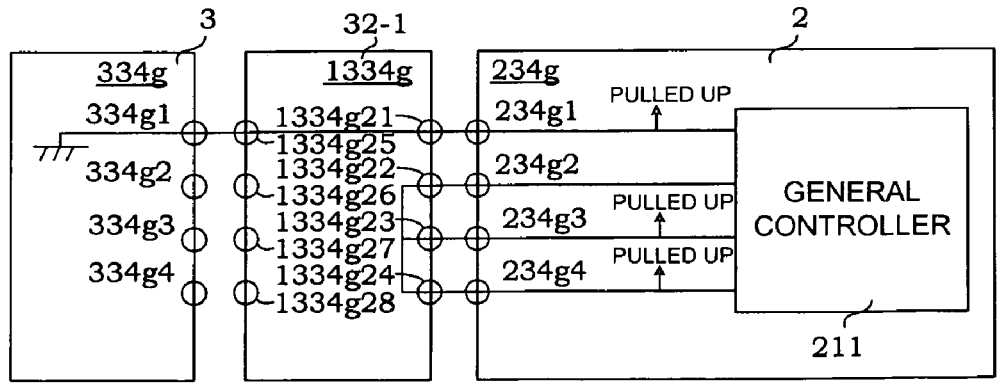
FIG. 18 shows condition where the image sensing unit is connected to the camera body through a 5-m extension cable.

The 5 meters extension cable 32-2 has four terminals 1334g21, 1334g22, 1334g23 and 1334g24 connecting with the four terminals 234g1, 234g2, 234g3 and 234g4 of the connecting terminal group 234g of the camera body 2, respectively, and four terminals 1334g25, 1334g26, 1334g27 and 1334g28 connecting with the four terminals 334g1, 334g2, 334g3 and 334g4 of the image sensing unit 3, respectively. In the 5 meters extension cable 32-2, the terminals 1334g21 and the terminal 1334g25 are connected together, the terminal 1334g22, the terminal 1334g23 and the terminal 1334g24 are connected together, and the other terminals 1334g26, 1334g27 and 1334g28 are not connected anywhere. The connection condition of the terminals in a case when the image sensing unit 3 is connected to the camera body 2 through the 5 meters extension cable 32-2 is shown in FIG. 18.

Figure 19:
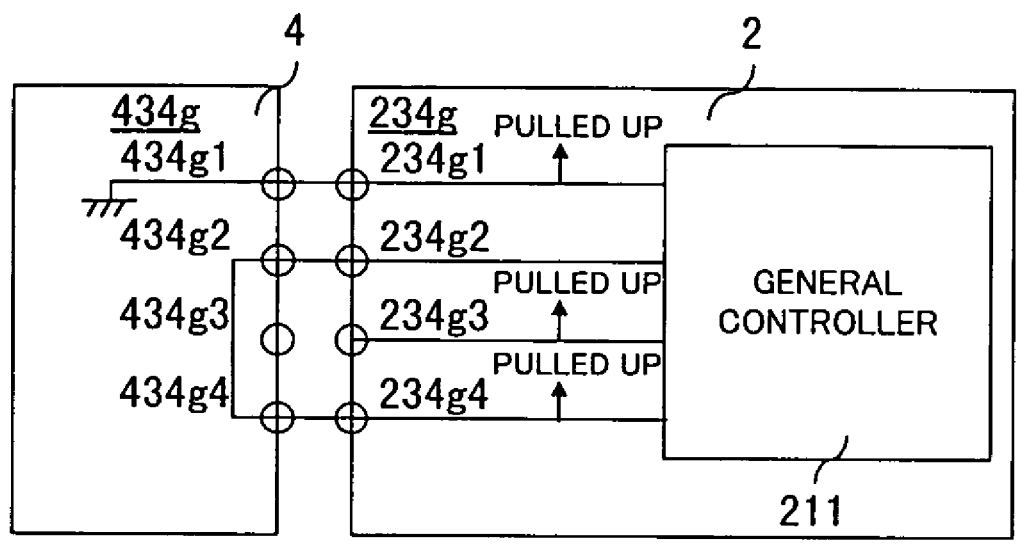
FIG. 19 shows condition where the personal computer interface is connected to the camera body.

The personal computer interface 4 has four terminals 434g1, 434g2, 434g3 and 434g4 connecting with the four terminals 234g1, 234g2, 234g3 and 234g4 of the connecting terminal group 234g of the camera body 2, respectively. In the personal computer interface 4, the terminal 434g1 is grounded, the terminal 434g2 and the terminal 434g4 are connected together, and the other terminal 434g3 is not connected anywhere. The connection condition of the terminals in a case where the personal computer interface 4 is connected to the camera body 2 is shown in FIG. 19.

Figure 20:
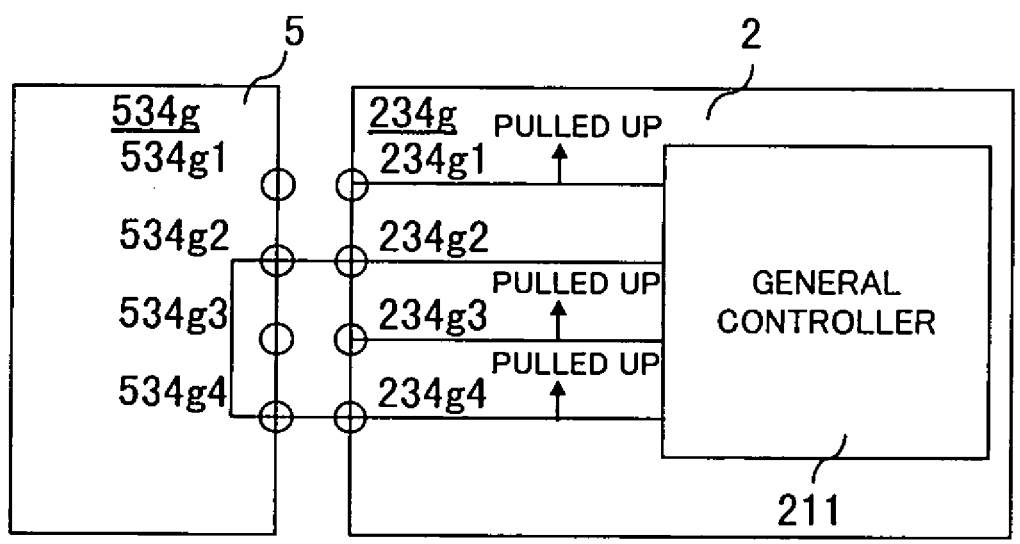
FIG. 20 shows condition where the video capture adapter is connected to the camera body.

The video capture adapter 5 has four terminals 534g1, 534g2, 534g3 and 534g4 connecting with the four terminals 234g1, 234g2, 234g3 and 234g4 of the connecting terminal group 234g of the camera body 2, respectively. In the video capture adapter 5, the terminal 534g2 and the terminal 534g4 are connected together, and the other terminals 534g1 and 534g3 are not connected anywhere. The connection condition of the terminals in a case where the video capture adapter 5 is connected to the camera body 2 is shown in FIG. 20.

According to the above-mentioned structure, the relationship between the condition of connection of connection devices to the camera body 2, and the voltage level of the terminal 234g1, whether there is continuity between the terminal 234g2 and the terminal 234g3 or not and whether there is continuity between the terminal 234g2 and the terminal 234g4 or not is as shown in FIG. 21, and the general controller 211 can recognize the condition of connection of connection devices to the camera body 2.

Hereinafter, control performed by the general controller 211 will be described with reference to the flowchart shown in FIG. 22. When the body control system power source portion E100 is activated by operating the power switch PS and power supply is started, first, the voltage level of the terminal 234g1, whether there is continuity between the terminal 234g2 and the terminal 234g3 or not and whether there is continuity between the terminal 234g2 and the terminal 234g4 or not, that is, information on connection of the connection device to the camera body 2 is obtained (step #10). Then, the condition of connection of the connection device to the camera body 2 is recognized based on the information obtained at #10 (#20).

When it is recognized at #20 that the personal computer interface 4 is connected to the camera body 2 as the connection device, power is supplied to the personal computer interface system power source portion E140 and no power is supplied to the flash control circuit 214, the AF motor system power source portion E110, the AF sensor and timing generator system power source portion E120, the CCD and CCD drive circuit system power source portion E130 and the video capture adapter system power source portion E150 (#30). Then, the process shifts to a subroutine (#40) to perform processing such as image data transfer necessary when the personal computer interface 4 is connected.

When it is recognized at #20 that the video capture adapter 5 is connected to the camera body 2, power is supplied to the video capture adapter system power source portion E150 and no power is supplied to the flash control circuit 214, the AF motor system power source portion E110, the AF sensor and timing generator system power source portion E120, the CCD and CCD drive circuit system power source portion E130 and the personal computer interface system power source portion E140 (#50). Then, the process shifts to a subroutine (#60) to perform processing such as video signal capture necessary when the video capture adapter 5 is connected.

When it is recognized at #20 that the image sensing unit 3 is connected to the camera body 2 through the extension cable 32, the type of the extension cable 32 is determined (#65). When it is recognized that the length of the extension cable 32 is 5 m, power is supplied to the AF motor system power source portion E110, the AF sensor and timing generator system power source portion E120 and the CCD and CCD drive circuit system power source portion E130 and no power is supplied to the flash control circuit 214, the personal computer interface system power source portion E140 and the video capture adapter system power source portion E150 (#70). Then, the process shifts to a subroutine (#90) to perform digital camera processing in the shooting mode and the reproduction mode in a condition where the image sensing unit 3 is connected.

When it is recognized that the length of the extension cable 32 is 1.5 meters, power is supplied to the flash control circuit 214, the AF motor system power source portion E110, the AF sensor and timing generator system power source portion E120 and the CCD and CCD drive circuit system power source portion E130 and no power is supplied to the personal computer interface system power source portion E140 and the video capture adapter system power source portion E150 (#80). Then, the process shifts to #90.

When it is recognized at #20 that the image sensing unit 3 is connected to the camera body 2 directly (not through the extension cable 32), the process shifts to #80 like in the case where it is recognized that the image sensing unit 3 is connected to the camera body 2 through the 1.5 meters extension cable 32.

When it is recognized at #20 that nothing is connected to the camera body 2 or that although the extension cable 32 is connected, the image sensing unit 3 is not connected to the extension cable 32, no power is supplied to the flash control circuit 214, the AF motor system power source portion E110, the AF sensor and timing generator system power source portion E120, the CCD and CCD drive circuit system power source portion E130, the personal computer interface system power source portion E140 and the video capture adapter system power source portion E140 (#100). Then, the process shifts to a subroutine (#110) to perform processing necessary in the reproduction mode.

By the above-described control, for example, to the flash control circuit 214, no power is supplied when the personal computer interface 4 or the video capture adapter 5 is connected to the camera body 2, when the image sensing unit 3 is connected to the camera body 2 through the 5 meters extension cable 32, when nothing is connected to the camera body 2 and when the image sensing unit 3 is not connected to the extension cable 32 although the extension cable 32 is connected to the camera body 2. This is because in the above-mentioned conditions of connection of the connection devices to the camera body 2, the built-in flash 13 cannot function and it is therefore unnecessary to drive the flash control circuit 214.

No power is supplied to the flash control circuit 214 when the image sensing unit 3 is connected to the camera body 2 through the 5 meters extension cable 32. This is because the light projection distance of the built-in flash 13 is approximately 4 m and when the image sensing unit 3 is connected through the 5 meters extension cable 32, flash light does not reach and the possibility is high that the built-in flash 13 cannot function. In this case, when the flash shooting mode is selected by the FL mode setting switch 11, warning may be provided, or the flash shooting mode may be unselectable.

To the AF motor system power source portion E110, the AF sensor and timing generator system power source portion E120 and the CCD and CCD drive circuit system power source portion E130, no power is supplied when the personal computer interface 4 or the video capture adapter 5 is connected to the camera body 2, when nothing is connected to the camera body 2 and when the image sensing unit 3 is not connected to the extension cable 32 although the extension cable 32 is connected to the camera body 2, that is, except when the image sensing unit 3 is connected to the camera body 3 directly or through the extension cable 32. This is because these power source portions are for supplying power to the circuit blocks in the image sensing unit 3 and it is therefore unnecessary to drive them in these cases.

To the personal computer interface system power source portion E140, no power is supplied except when the personal computer interface 4 is connected to the camera body 2. This is because the power source portion E140 is for supplying power to the circuits in the personal computer interface 4 and it is therefore unnecessary to drive the personal computer interface except when the personal computer interface 4 is connected.

To the video capture adapter system power source portion E150, no power is supplied except when the video capture adapter 5 is connected to the camera body 2. This is because the power source portion E150 is for supplying power to the circuits in the video capture adapter 5 and it is therefore unnecessary to drive the video capture adapter except when the video capture adapter 5 is connected.

As described above, in the digital camera 1 of this embodiment, since no power is supplied to circuits that it is unnecessary to drive by controlling power supply to circuits associated with connection devices, specifically, the flash control circuit 214, the AF motor system power source portion E110, the AF sensor and timing generator system power source portion E120, the CCD and CCD drive circuit system power source portion E130, the personal computer interface system power source portion E140 and the video capture adapter system power source portion E150, unnecessary power consumption is restrained, so that power consumption is reduced.

After steps #40, #60, #90 and #110, the following steps are provided: steps #120, #130, #140 and #150 where ON condition of the microswitch 316 is detected which condition is caused when the user detaches the image sensing unit 3 or an accessory from the camera body 2 by operating the unlocking lever 315 or when the user attaches the image sensing unit 3 or an accessory to the camera body 2; and steps #160, #170, #180 and #190 where the process returns to steps #40, #60, #90 and #110 when the microswitch 316 is not ON as a result of the detection at steps #120, #130, #140 and #150 and shifts to #10 when the microswitch 316 is ON.

With this, the condition of connection of the connection device to the camera body 2 is recognized every time the connection device connected to the camera body 2 is changed and the power supply condition is switched in accordance with the connection device after the change, so that even when the connection device is changed, unnecessary power consumption is restrained and low-power-consumption state can be maintained.

When detachment of the image sensing unit 3 or an accessory from the camera body 2 is detected, power supply to the body control system power source portion E100 may be stopped to deactivate the entire digital camera 1.

When the digital camera 1 is provided with a function of emitting auxiliary light in automatic focusing, power supply to the circuit blocks involved only in the emission of the AF auxiliary light may be stopped when the personal computer interface 4 or the video capture adapter 5 is connected to the camera body 2 and when neither the image sensing unit 3 nor an accessory is connected to the camera body 2 or when the image sensing unit 3 is not connected to the extension cable 32 although the extension cable 32 is connected to the camera body 2. This is because the digital camera 1 cannot enter the shooting mode and does not perform automatic focusing in such cases.

In a case where an auxiliary light emitter is provided on the side of the camera body 2, power supply to the circuit blocks involved only in the emission of the AF auxiliary light may be stopped when the image sensing unit 3 is connected to the camera body 2 through the extension cable 32. This is because the subject surface and the auxiliary light emitting surface are not likely to face each other at the time of shooting and the possibility is high that the emission of the AF auxiliary light is meaningless in such a case. By doing this, unnecessary power consumption can further be restrained and reduction in power consumption can be promoted.

While the flash is incorporated in the camera body 2 in the digital camera 1 of the above-described embodiment, the flash may be of a type that is connected to the camera body 2. Moreover, while the unlocking lever 315 and the microswitch 316 are provided on the image sensing unit 3 and accessories, they may be provided on the camera body 2. Further, accessories may be connected through the extension cable 32.

Obviously, many modifications and variations of the present invention are possible in light of the above teachings. It is therefore to be understood that within the scope of the appended claims, the invention may be practiced other than as specifically described.

What is claimed is:

1. A digital camera comprising:
   an image sensing unit including:
      a taking lens; and
      an image sensing device for sensing a subject image formed by said taking lens and outputting the subject image as an electric signal; and a camera body including:
an image processor for performing predetermined processing on the electric signal from said image sensing unit;
a detector for detecting a condition of a proper connection of said image sensing unit to said camera body;
a power supply controller for selectively controlling power supply in said camera body, wherein said selection is determined in accordance with a result of the detection; and
a flash control circuit for controlling light emission of a flash light emitter;
wherein in a case where said image sensing unit is connected to said camera body through a cable, when said detector detects that the cable has a length larger than a predetermined length, said power supply controller does not supply power to said flash control circuit.

2. A digital camera as claimed in claim 1, wherein when said detector detects that said image sensing unit is not connected to said camera body, said power supply controller does not supply power to said flash control circuit.

3. A digital camera as claimed in claim 1, wherein said image processor has a recorder for recording the electric signal as image data.

4. A digital camera as claimed in claim 1, further comprising a plurality of power supply portions for supplying power to a plurality of circuits in said digital camera, wherein power is supplied only to a specific power supply portion in accordance with the result of the detection.

5. The digital camera as claimed in claim 1, wherein the selection is automatically performed in response to the said detector detecting a condition of connection.

6. A digital camera to which an image sensing unit having a taking lens and an image sensing device is connectable, comprising:
a connection device provided on a main body of the digital camera for detachably connecting external devices including said image sensing device;
an image processor for performing predetermined processing on image data from said image sensing unit;
a detector for detecting a condition of connection of an external device when connected to said connection device and for identifying the external device based on a detected condition of connection;
a power supply controller for controlling power supply to said digital camera in accordance with a result of the detection; and
a flash control circuit for controlling flash light emission;
wherein in a case where said image sensing unit is connected to a camera body through a cable, when said detector detects that the cable has a length larger than a predetermined length, said power supply controller does not supply power to said flash control circuit.

7. A digital camera as claimed in claim 6, wherein when it is detected that said image sensing unit is not connected, said power supply controller stops power supply to a circuit in said digital cameras which circuit is associated with said image sensing unit.

8. A digital camera as claimed in claim 6, further comprising a power supply portion for supplying power only to said image sensing unit, wherein when it is detected that said image sensing unit is not connected, said power supply controller does not supply power to said power supply portion.

9. A digital camera as claimed in claim 6, further comprising a plurality of power supply portions for supplying power to a plurality of circuits in said digital camera, wherein power is supplied only to a specific power supply portion in accordance with the result of the detection.

10. A digital camera as claimed in claim 6, wherein when said detector detects that said image sensing unit is not connected to a camera body, said power supply controller does not supply power to said flash control circuit.

11. A digital camera as claimed in claim 6, wherein said image processor has a recorder for recording an electric signal as image data.

12. The digital camera as claimed in claim 6, wherein the power supply controller selectively controls power supply automatically in response to said detector detecting a condition of connection.

13. A power source control method in a digital camera having a connector to which each of a plurality of detachable device types, including an image sensing unit having a taking lens and an image sensing device, is replaceably connectable, said method comprising the steps of:
detecting a condition of connection of a detachable device to said digital camera;
identifying the type of device connected to the connector of said camera based on a detected condition of connection; and
controlling power supply in said digital camera in accordance with a result of the detection, to selectively supply power to at least one power supply portion of the camera and not to other power supply portions of the camera, the selection being based on a type identified in the step of detecting.

14. A power source control method as claimed in claim 13, wherein when it is detected that said image sensing unit is not connected, power supply to a circuit in said digital camera which circuit is associated with said image sensing unit is stopped.

15. A power source control method as claimed in claim 13, wherein a different unit is connectable to said digital camera, and a condition of connection of the different unit is detected in said detecting step.

16. The power source control method as claimed in claim 13, wherein controlling the power supply in said digital camera comprises selectively controlling power supply automatically in response to said detector detecting a condition of connection.

17. A digital camera comprising:
a detachably connectable image sensing device including:
a taking lens; and
an image sensing device for sensing a subject image formed by said taking lens and outputting the subject image as an electric signal; and
a camera body including:
a connection terminal for connecting the image sensing unit or a different detachably connectable device;
an image processor for performing a predetermined processing on the electric signal from said image sensing device;
a detector for detecting a condition of connection of one of the detachable devices and for determining which detachable device is connected based on the detected condition; and
a power supply controller for controlling power supply in said camera body in accordance with a result of the detection, and including control logic for selectively supplying power to portions of the camera and not to other portions of the camera, the selection being based on a detected type of the device detected by the detector.

18. A digital camera as claimed in claim 17, wherein said camera body has a flash control circuit for controlling light emission of a flash light emitter.

19. A digital camera as claimed in claim 18, wherein when said detector detects that said image sensing unit is not connected to said camera body, said power supply controller does not supply power to said flash control circuit.

20. A digital camera as claimed in claim 17, wherein said image processor has a recorder for recording the electric signal as image data.

21. A camera according to claim 17, wherein the different detachably connectable device comprises one of an extension cable, a personal computer interface and a video capture adapter.

22. The digital camera as claimed in claim 17, wherein the power supply controller selectively controls power supply automatically in response to said detector detecting a condition of connection.

23. A digital camera comprising:
  a detachably connectable image sensing device including:
    a taking lens; and
    an image sensing device for sensing a subject image formed by said taking lens and outputting the subject image as an electric signal; and
  a camera body including:
    a connection terminal for connecting the image sensing unit or a different detachably connectable device;
    an image processor for performing a predetermined processing on the electric signal from said image sensing device;
    a detector for detecting a condition of connection of one of the detachable devices and for determining which detachable device is connected based on the detected condition;
  a power supply controller for controlling power supply in said camera body in accordance with a result of the detection, and
  a flash control circuit for controlling light emission of a flash light emitter
  wherein in a case where said image sensing unit is connected to said camera body through a cable, when said detector detects that the cable has a length larger than a predetermined length, said power supply controller does not supply power to said flash control circuit.

* * * * *